United States Patent
Liu et al.

(10) Patent No.: US 11,738,413 B2
(45) Date of Patent: Aug. 29, 2023

(54) FILLER FOR VACUUM BRAZING OF TU1 OXYGEN-FREE COPPER AND APPLICATION THEREOF

(71) Applicant: Wuxi Unicomp Technology Co., Ltd., Wuxi (CN)

(72) Inventors: Jun Liu, Wuxi (CN); Liucheng Wang, Wuxi (CN); Xiaojun Qiu, Wuxi (CN); Wei Zhang, Wuxi (CN)

(73) Assignee: Wuxi Unicomp Technology Co., Ltd., Wuxi (CN)

( * ) Notice: Subject to any disclaimer, the term of this patent is extended or adjusted under 35 U.S.C. 154(b) by 0 days.

(21) Appl. No.: 17/375,023

(22) Filed: Jul. 14, 2021

(65) Prior Publication Data

US 2022/0305591 A1 Sep. 29, 2022

(30) Foreign Application Priority Data

Mar. 23, 2021 (CN) .......................... 202110307624.8

(51) Int. Cl.
| | |
|---|---|
| B23K 35/00 | (2006.01) |
| C22C 5/00 | (2006.01) |
| B23K 35/30 | (2006.01) |
| C22C 5/02 | (2006.01) |
| B23K 103/12 | (2006.01) |

(52) U.S. Cl.
CPC ............ B23K 35/3013 (2013.01); C22C 5/02 (2013.01); *B23K 2103/12* (2018.08)

(58) Field of Classification Search
CPC .... B23K 35/3013; B23K 2103/12; C22C 5/02

USPC .................................................. 420/507, 512
See application file for complete search history.

(56) References Cited

U.S. PATENT DOCUMENTS

| | | | | |
|---|---|---|---|---|
| 4,473,621 A | * | 9/1984 | Drylie | ...................... C22C 5/02 |
| | | | | 420/512 |
| 4,591,535 A | * | 5/1986 | Mizuhara | .............. C04B 37/026 |
| | | | | 420/512 |
| 4,604,328 A | * | 8/1986 | Mizuhara | ........... B23K 35/3013 |
| | | | | 420/512 |
| 4,606,978 A | * | 8/1986 | Mizuhara | .............. B23K 35/322 |
| | | | | 420/512 |
| 4,690,876 A | * | 9/1987 | Mizuhara | ........... B23K 35/3033 |
| | | | | 148/435 |
| 2001/0036419 A1 | * | 11/2001 | Weinstein | .......... B23K 35/3013 |
| | | | | 420/466 |
| 2004/0086416 A1 | * | 5/2004 | Winstein | ............ B23K 35/3013 |
| | | | | 420/507 |

(Continued)

FOREIGN PATENT DOCUMENTS

| | | | | |
|---|---|---|---|---|
| CN | | 102115834 A | * 7/2011 | |
| CN | | 104057213 A | * 9/2014 | ......... B23K 35/3013 |

(Continued)

*Primary Examiner* — Kiley S Stoner
(74) *Attorney, Agent, or Firm* — Bayramoglu Law Offices LLC

(57) ABSTRACT

A filler for vacuum brazing of TU1 oxygen-free copper is an Au—Cu—Ni filler including the following elemental compositions in a specified proportion: 69% to 90% of Au, 9% to 30% of Cu, and 1% to 5% of Ni. The filler has a melting temperature of 900° C. to 910° C. The filler for vacuum brazing of TU1 oxygen-free copper can be used for brazing X-ray tube anodes, thereby realizing effective vacuum brazing.

5 Claims, 2 Drawing Sheets

(56) References Cited

U.S. PATENT DOCUMENTS

| | | | |
|---|---|---|---|
| 2004/0229069 A1* | 11/2004 | Sandin | B23K 35/3013 |
| | | | 428/617 |
| 2006/0019118 A1* | 1/2006 | Gales | B23B 27/148 |
| | | | 428/457 |
| 2007/0068992 A1* | 3/2007 | Ozbaysal | C22C 5/02 |
| | | | 228/56.3 |

FOREIGN PATENT DOCUMENTS

| | | | | | |
|---|---|---|---|---|---|
| CN | 103298582 | B | * | 9/2015 | ........... B23K 1/0008 |
| CN | 106211763 | B | * | 8/2019 | ............. B23K 35/02 |
| CN | 111805040 | A | * | 10/2020 | |
| CN | 113042932 | A | * | 6/2021 | ......... B23K 35/3013 |
| DE | 1942143 | A1 | * | 1/1970 | |
| EP | 1775350 | A1 | * | 4/2007 | ........... B22F 1/0003 |
| JP | 2013136078 | A | * | 7/2013 | |

* cited by examiner

FILLER FOR VACUUM BRAZING OF TU1 OXYGEN-FREE COPPER AND APPLICATION THEREOF

CROSS REFERENCE TO THE RELATED APPLICATIONS

This application is based upon and claims priority to Chinese Patent Application No. 202110307624.8, filed on Mar. 23, 2021, the entire contents of which are incorporated herein by reference.

TECHNICAL FIELD

The present invention relates to the technical field of vacuum brazing, and specifically to a filler for vacuum brazing of TU1 oxygen-free copper.

BACKGROUND

The X-ray tube is the core component of X-ray intelligent detection equipment. During the production of X-ray tubes, the TU1 oxygen-free copper bar anode typically needs to introduce an oxygen-free copper support for fixing the tungsten (W) target surface that receives particles emitted by the cathode, thereby producing X-rays.

At present, the vacuum brazing technique is frequently used in the research and development of X-ray tubes, serving as a reliable method for TU1 oxygen-free copper brazing. When vacuum brazing is performed using an existing filler, pores, cracks, ablation, and the like easily appear at the brazed joint due to the defects of the filler itself, thereby affecting the brazing effect and the durability of the X-ray tube. Moreover, due to the fact that X-ray tubes require cleanliness and a high vacuum degree therein, those fillers that are prone to produce a high vapor pressure are not the preferred choice.

Therefore, to solve the problems occurring in the brazing of X-ray tube anodes, it is highly desirable to provide a filler suitable for vacuum brazing of TU1 oxygen-free copper.

SUMMARY

An objective of the present invention is to provide a filler for vacuum brazing of TU1 oxygen-free copper and an application thereof, to solve the problem that fillers in the prior art cannot meet the high requirements for vacuum brazing of TU1 oxygen-free copper.

To achieve the above-mentioned objective, the present invention provides the following technical solutions.

A filler for vacuum brazing of TU1 oxygen-free copper is an Au—Cu—Ni filler including the following elemental compositions in a specified proportion: 69% to 90% of Au, 9% to 30% of Cu, and 1% to 5% of Ni.

Further, the filler includes the following elemental compositions in a specified proportion: 74% to 81% of Au, 15% to 22% of Cu, and 3.5% to 4.5% of Ni.

Further, the filler includes the following elemental compositions in a specified proportion: 77% to 80% of Au, 16% to 19% of Cu, and 3.8% to 4.1% of Ni.

Further, the filler includes the following elemental compositions in a specified proportion: 78.25% of Au, 17.78% of Cu, and 3.97% of Ni.

The filler has a melting temperature of 900° C. to 910° C.

The filler for vacuum brazing of TU1 oxygen-free copper according to the present invention can be used for brazing X-ray tube anodes.

A large number of experimental studies in the present invention suggests that:

The selection of a specific Au-based filler and the adjustment of elemental proportions in the filler have a great impact on the effect of vacuum brazing. Since it is difficult to obtain the specific elemental proportions, the present invention first uses fillers composed of Au and Cu in different proportions to braze oxygen-free copper, thereby obtaining the specific brazing effects as shown in Table 1.

TABLE 1

Brazing effects and defect types of fillers with elemental compositions in different proportions

| Elemental composition | Weight percentage (%) | Brazing effect (excellent, good, poor) | Brazing defect |
|---|---|---|---|
| Au, Cu | 90%, 10% | Good | Ablation, poor brazing |
| Au, Cu | 80%, 20% | Excellent | Fewer |
| Au, Cu | 70%, 30% | Good | Pores, poor brazing |
| Au, Cu | 60%, 40% | Poor | Pores, poor brazing |
| Au, Cu | 50%, 50% | Poor | A combination of various brazing defects |

It can be seen from the experimental results in Table 1 that an excessively high proportion of Au will cause over-ablation at the brazed joint, while a relatively low proportion of Au will weaken the wetting effect of the filler, leading to porosity. Further, when the proportion of Au is less than 50%, a combination of various brazing defects will occur during the brazing process of oxygen-free copper. According to the comparative observation of the brazed joints of oxygen-free copper, the filler composed of 80% of Au and 20% of Cu has a comparatively excellent brazing effect.

However, it is found through further experimental studies that, due to the fact that pure Au has a soft texture, a large amount of Au in the filler will weaken the strength and stability of the brazed joint produced during brazing. In this regard, in the present invention, Ni with high strength is additionally mixed into the filler.

It is found through experiments that an excessively high proportion of Ni will destroy the overall ratio of Au to Cu, thereby affecting the brazing effect. In this regard, it is finally determined that the proportion of Ni is preferably lower than 5%. In the experiments of the present invention, the obtained fillers are used for brazing oxygen-free copper in a vacuum furnace, a sample with the optimal experimental result is subjected to scanning electron microscopy (SEM) and energy dispersive X-ray spectroscopy (EDS) tests to measure the optimal parameter (proportion), that is, the following elemental compositions in a specified proportion: 78.25% of Au, 17.78% of Cu, and 3.97% of Ni.

In the process of vacuum brazing, the selection of brazing parameters plays a decisive role in the brazing effect. For high-precision vacuum tubes, an excessively high vacuum degree during brazing is easy to generate a vapor pressure and cause surface oxidation of oxygen-free copper, thereby greatly reducing the lifespan of the vacuum tube. According to the threshold associated with vacuum pumping in the equipment, the vacuum degree in a chamber during brazing should be lower than $10^{-4}$ Pa. As for the brazing temperature, the heating temperature of a filament in a vacuum brazing furnace should be higher than the melting point of the filler and lower than the melting point of oxygen-free copper, such that the molten filler can achieve the brazing effect under the actions of wetting and capillary flow. Therefore, the heating temperature is selected to be higher than 900° C.

The large number of experimental studies above arrive at the following conclusions:

(1) The Au-based filler of the present invention exhibits excellent wettability and spreadability for oxygen-free copper.

(2) The Au-based filler of the present invention can be used in a vacuum brazing process where the brazed joint needs to have excellent corrosion resistance, high strength, and high-temperature and high-pressure resistance. Moreover, when the Au-based filler of the present invention is used for brazing substrates in a vacuum environment, the vapor pressure generated is low, such that the vacuum component can obtain excellent cleanliness, and thus is reliable and stable under the continuous action of high pressure without being broken by a high-voltage arc.

(3) The filler used for brazing an oxygen-free copper bar and an oxygen-free copper support for the tungsten target surface (as shown in FIG. 1 to FIG. 3) according to the present invention is composed of Au, Cu and Ni in the following proportion: 78.25% of Au, 17.78% of Cu, and 3.97% of Ni.

(4) The proportion of Ni in the Au—Cu—Ni filler of the present invention is 3.97%. Adding Ni in this proportion can increase the connection strength of the brazed joint (as shown in FIG. 1 to FIG. 3) while accelerating the full reaction of the filler with a base material under the action of a high temperature during the brazing process to improve the wetting performance, thereby achieving the brazing with excellent comprehensive performance.

(5) The filler of the present invention has a melting temperature of 900° C. to 910° C., which is lower than the melting points of Au (1064.43° C.) and Cu (1083.4° C.). Both theoretically and practically, the Au—Cu—Ni-based filler for vacuum brazing of TU1 oxygen-free copper according to the present invention has high reliability.

Compared with the prior art, the present invention has the following advantages.

The filler for vacuum brazing of TU1 oxygen-free copper according to the present invention is suitable for brazing X-ray tube anodes to realize effective vacuum brazing with an excellent brazing effect.

DETAILED DESCRIPTION OF THE EMBODIMENTS

Figure 1:
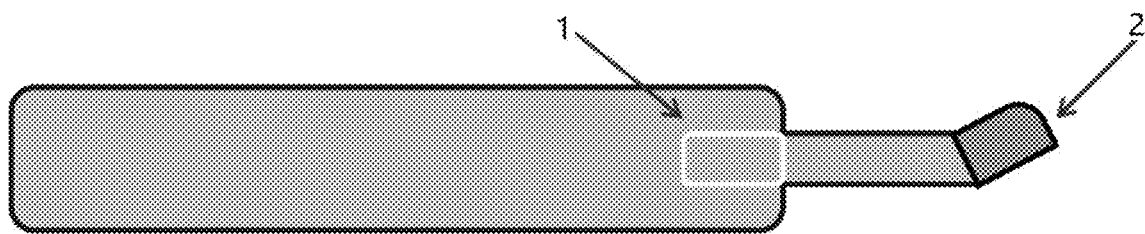
FIG. 1 is a schematic diagram of a brazed joint, where 1 represents a brazed joint and 2 represents a tungsten target surface.
Figure 2:
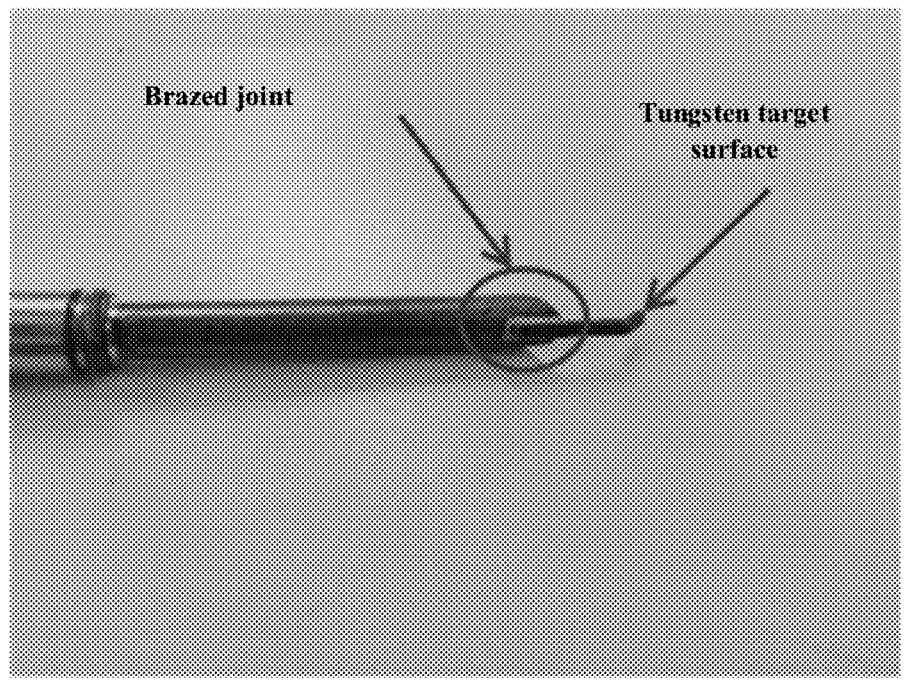
FIG. 2 is a picture showing the macroscopic surface morphology of the brazed joint.
Figure 3:
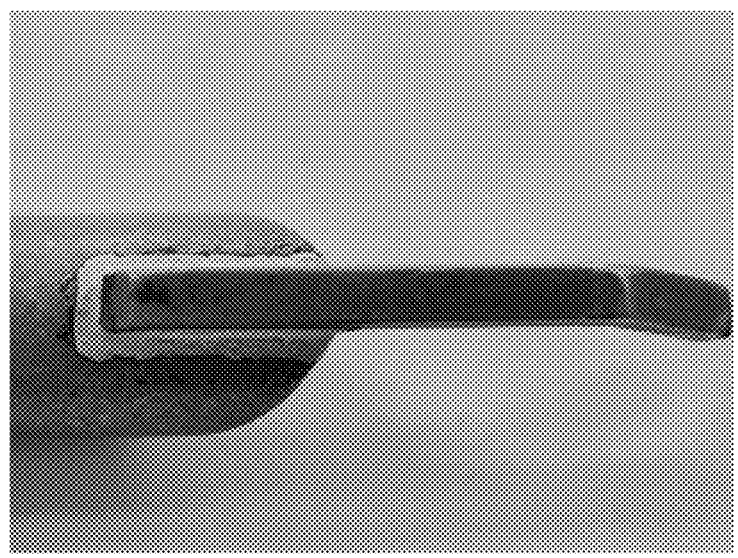
FIG. 3 is a partially enlarged picture showing the macroscopic surface morphology of the brazed joint.

The technical solutions in the embodiments of the present invention are clearly and completely described below with reference to the drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the scope of protection of the present invention.

Embodiment 1

A filler for vacuum brazing of TU1 oxygen-free copper is an Au—Cu—Ni filler including the following elemental compositions in a specified proportion: 69% to 90% of Au, 9% to 30% of Cu, and 1% to 5% of Ni.

Embodiment 2

A filler for vacuum brazing of TU1 oxygen-free copper is an Au—Cu—Ni filler including the following elemental compositions in a specified proportion: 74% of Au, 22% of Cu, and 4% of Ni.

Embodiment 3

A filler for vacuum brazing of TU1 oxygen-free copper is an Au—Cu—Ni filler including the following elemental compositions in a specified proportion: 81% of Au, 15% of Cu, and 4% of Ni.

Embodiment 4

A filler for vacuum brazing of TU1 oxygen-free copper is an Au—Cu—Ni filler including the following elemental compositions in a specified proportion: 78% of Au, 18% of Cu, and 4% of Ni.

Embodiment 5

A filler for vacuum brazing of TU1 oxygen-free copper is an Au—Cu—Ni filler including the following elemental compositions in a specified proportion: 77% of Au, 19% of Cu, and 4% of Ni.

Embodiment 6

A filler for vacuum brazing of TU1 oxygen-free copper is an Au—Cu—Ni filler including the following elemental compositions in a specified proportion: 78.2% of Au, 18% of Cu, and 3.8% of Ni.

Embodiment 7

A filler for vacuum brazing of TU1 oxygen-free copper is an Au—Cu—Ni filler including the following elemental compositions in a specified proportion: 79% of Au, 16.9% of Cu, and 4.1% of Ni.

Embodiment 8

A filler for vacuum brazing of TU1 oxygen-free copper is an Au—Cu—Ni filler including the following elemental compositions in a specified proportion: 77.5% of Au, 18.6% of Cu, and 3.9% of Ni.

It is found from the comparison of the fillers in Embodiments 2 to 8 with a filler in the prior art that:

1. Compared with the Au-based filler of the present invention, commonly used Ag-based fillers (such as pure silver, $AgCu_{28}$, and $AgCu_{50}$) have lower wettability and reliability. In the electro-vacuum industry, any defects such as brazing pores are fatal. Therefore, the Au-based filler in the embodiments is superior as having strong corrosion resistance, low vapor pressure, and excellent fluidity and wettability.

2. Commonly used Cu-based fillers (such as $CuGe_{12}$ and $CuGe_{10-11}$, and $CuGeNi_{12-0.25}$) are cheap, but have wettability far worse than that of Au-based fillers and lead to a higher vapor pressure than Au-based fillers in a vacuum environment. Moreover, during the brazing process of oxygen-free copper, an excessively high proportion of Cu will affect the brazing effect of oxygen-free copper.

3. The filler with 80% of Au and 20% of Cu is obtained from preliminary experiments, also showing a certain effect of brazing oxygen-free copper. However, the filler is not added with Ni, and thus has slightly lower wettability, fluidity, and strength than the filler composed of Au, Cu and Ni, which is not conducive to the stability of the brazed joint in a long-term X-ray environment.

4. An excessively high proportion of Ni in the filler (such as 75% of Au, 15% of Cu, and 10% of Ni) will affect the optimal ratio of Au to Cu previously obtained, and will negatively affect the wettability of the filler.

Embodiment 9

A filler for vacuum brazing of TU1 oxygen-free copper is an Au—Cu—Ni filler including the following elemental compositions in a specified proportion: 78.25% of Au, 17.78% of Cu, and 3.97% of Ni. The filler has a melting temperature of 900° C. to 910° C.

Figure 4:
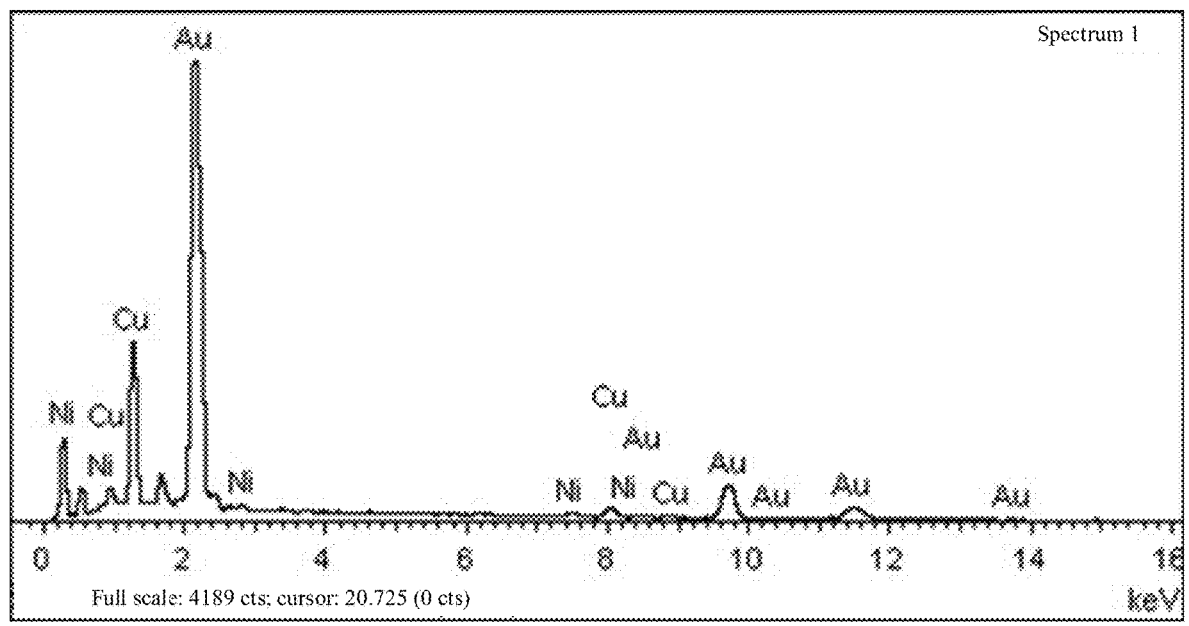
FIG. 4 is an EDS spectrum of the filler of the present invention.
Figure 5:
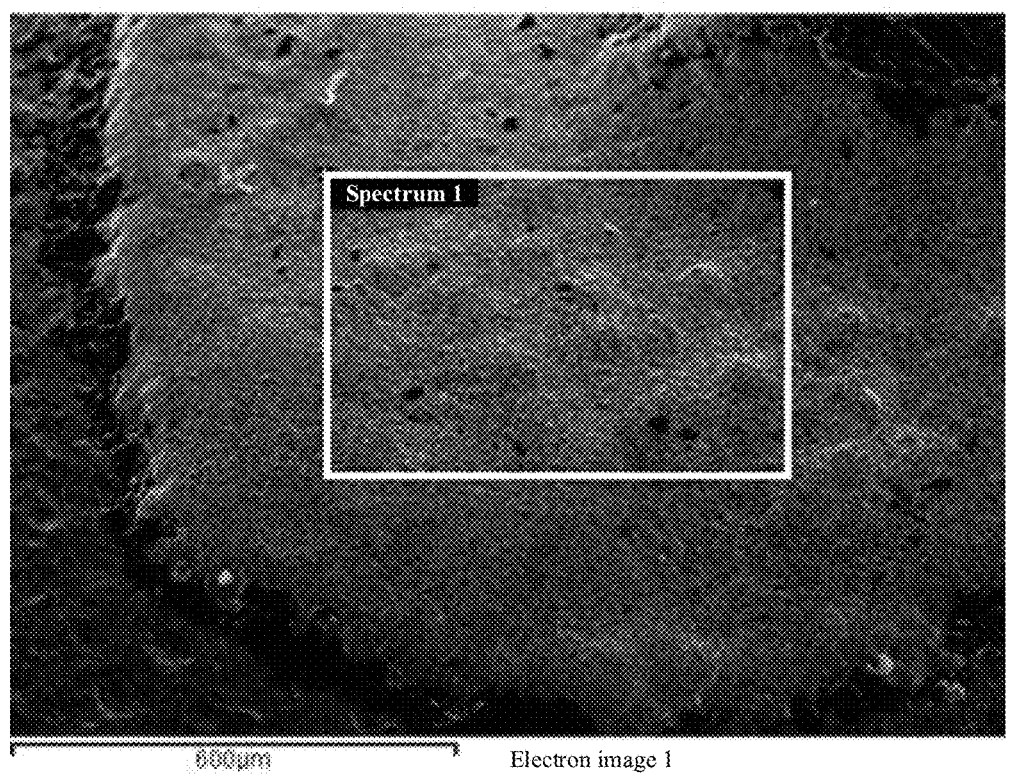
FIG. 5 is an image of a plane scanning area showing the microscopic morphology of the brazed joint.

The EDS spectrum and the plane scanning area of the filler are shown in FIG. 4 and FIG. 5, respectively. The elemental compositions of the filler in the plane area can be measured by EDS to verify the specific elemental compositions and proportions of different elements in the filler. The image of the plane scanning area shows the microscopic morphology of the brazed joint, so that the elemental compositions in this area can be measured.

The above results are consistent with the estimated proportion (about 80% of Au/about 20% of Cu+a certain proportion of Ni) designed and verified in the practical research and development, which proves that the filler of the present invention is effective and reliable for the brazing of oxygen-free copper. Moreover, compared with Embodiments 2 to 8, the addition of Ni in a proportion of 3.97% can achieve the optimal connection strength for the brazed joint.

| Embodiment | Connection strength of brazed joint (MPa) |
| --- | --- |
| 2 | 172 |
| 3 | 174 |
| 4 | 189 |
| 5 | 185 |
| 6 | 194 |
| 7 | 190 |
| 8 | 188 |
| 9 | 198 |

In addition, it is found through experiments that the Au—Ni filler has a connection strength of 124 MPa to 168 MPa. In comparison with the data in the above table, it can be known that the filler of the present invention also has higher connection strength than the Au—Ni filler.

Although the embodiments of the present invention have been illustrated and described, it should be understood that those of ordinary skill in the art may make various changes, modifications, replacements and variations to the above embodiments without departing from the principle and spirit of the present invention, and the scope of the present invention is limited by the appended claims and legal equivalents thereof.

What is claimed is:

1. A filler for vacuum brazing of TU1 oxygen-free copper, wherein the filler is an Au—Cu—Ni filler consisting of the following elemental compositions in a specified proportion of: 77% to 80% by weight of Au, 16% to 19% by weight of Cu, and 3.8% to 4.1% by weight of Ni, wherein the filler has a melting temperature of 900° C. to 910° C. and a connection strength between 172 and 198 MPa.

2. The filler according to claim 1, wherein
the filler consists of the following elemental compositions in a second specified proportion of: 78.25% by weight of Au, 17.78% by weight of Cu, and 3.97% by weight of Ni, wherein the filler has a melting temperature of 900° C. to 910° C. and a connection strength between 172 and 198 MPa.

3. A method of brazing an X-ray tube anode, comprising:
providing the filler according to claim 1 and vacuum brazing the filler to form the X-ray tube anode.

4. The method according to claim 3, wherein
the filler consists of the following elemental compositions in a specified proportion of: 77% to 80% by weight of Au, 16% to 19% by weight of Cu, and 3.8% to 4.1% by weight of Ni, wherein the filler has a melting temperature of 900° C. to 910° C. and a connection strength between 172 and 198 MPa.

5. The method according to claim 4, wherein
the filler consists of the following elemental compositions in a second specified proportion of: 78.25% by weight of Au, 17.78% by weight of Cu, and 3.97% by weight of Ni, wherein the filler has a melting temperature of 900° C. to 910° C. and a connection strength between 172 and 198 MPa.

* * * * *